United States Patent [19]

Mage et al.

[11] Patent Number: 4,979,064
[45] Date of Patent: Dec. 18, 1990

[54] MAGNETIC RECORDING/PLAYBACK HEAD COMPRISING A SUPERCONDUCTING MATERIAL

[75] Inventors: Jean-Claude Mage, Levallois Perret; Jean-Luc Rolland, Paris; Jean-Paul Castera, Orsay, all of France

[73] Assignee: Thomson-CSF, Paris, France

[21] Appl. No.: 262,719

[22] Filed: Oct. 26, 1988

[30] Foreign Application Priority Data

Oct. 27, 1987 [FR] France .................. 87 14825

[51] Int. Cl.$^5$ .................................. G11B 5/127
[52] U.S. Cl. ......................... 360/125; 360/126
[58] Field of Search .................. 360/125–126, 360/120

[56] References Cited

U.S. PATENT DOCUMENTS 3,098,181  7/1963  Cioffi .
3,214,679  10/1965  Richards .

FOREIGN PATENT DOCUMENTS 0199522  10/1986  European Pat. Off. .
 588105  11/1933  Fed. Rep. of Germany .
1522971  10/1969  Fed. Rep. of Germany .
2100090   6/1973  Fed. Rep. of Germany .

OTHER PUBLICATIONS

Patent Abstracts of Japan, vol. 9, No. 329, (P-416) [2052], Dec. 24, 1985 & JP 60154315, Aug. 14, 1985, Magnetic Head, Takihiro, Ogawa.
Patent Abstracts of Japan, vol. 6, No. 217 (P-152) [1095], Oct. 30, 1982 & JP 57120221, Jul. 27, 1982, Ring Head for Vertical Magnetization Recording and Reproduction, Mamoru Sugimoto.
IBM Technical Disclosure Bulletin, vol. 18, No. 1, Jun. 1975, pp. 19–22, New York, U.S.; L. T. Romankiw et al. Thin Film and Thin-Film/Ferrite Hybrid Magnetic Heads.
Patent Abstracts of Japan, vol. 7, No. 30 (p-173) [1175], Feb. 5, 1983; & JP 57183616, 11/12/1982, Magnetic Head, Yutaka Hara.
Patent Abstracts of Japan, vol. 6, No. 27 (P-102) [905], Feb. 17, 1982 & P 56145514, 11/12/1981, Thin-Film Magnetic Head, Hiroshi Tsuchiya.

Primary Examiner—A. J. Heinz
Attorney, Agent, or Firm—Oblon, Spivak, McClelland, Maier & Neustadt

[57] ABSTRACT

In a magnetic head, there is provided, in the gap, a superconducting material that has zero permeability and prevents the passage of the magnetic field in the gap. Various alternative embodiments are used to improve the efficiency of the head by channelling the magnetic flux outside the gap.

5 Claims, 5 Drawing Sheets

FIG_1 PRIOR ART
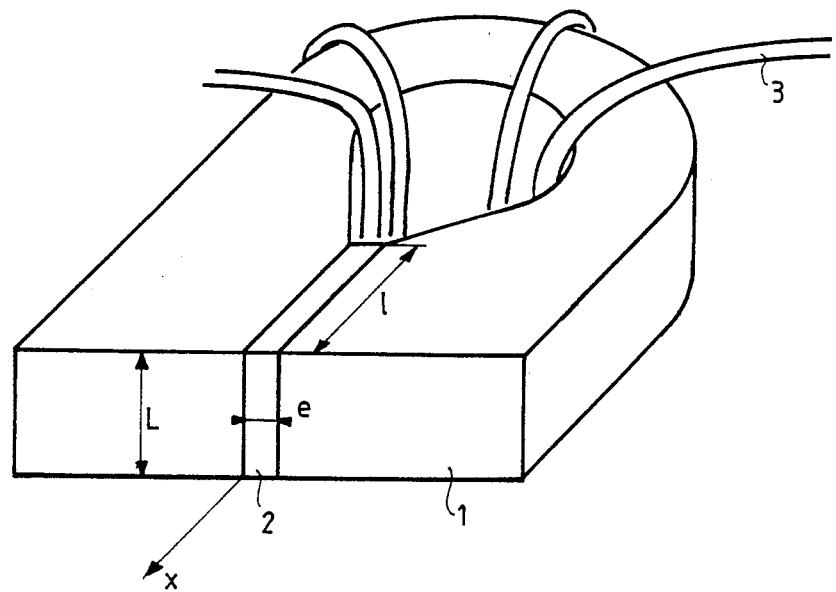
FIG_3
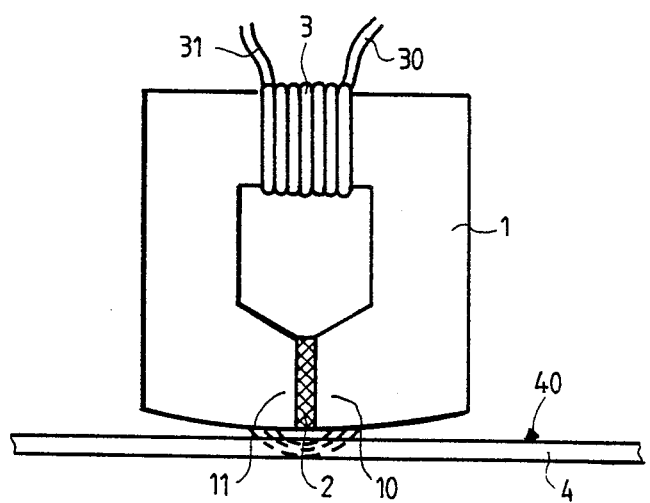

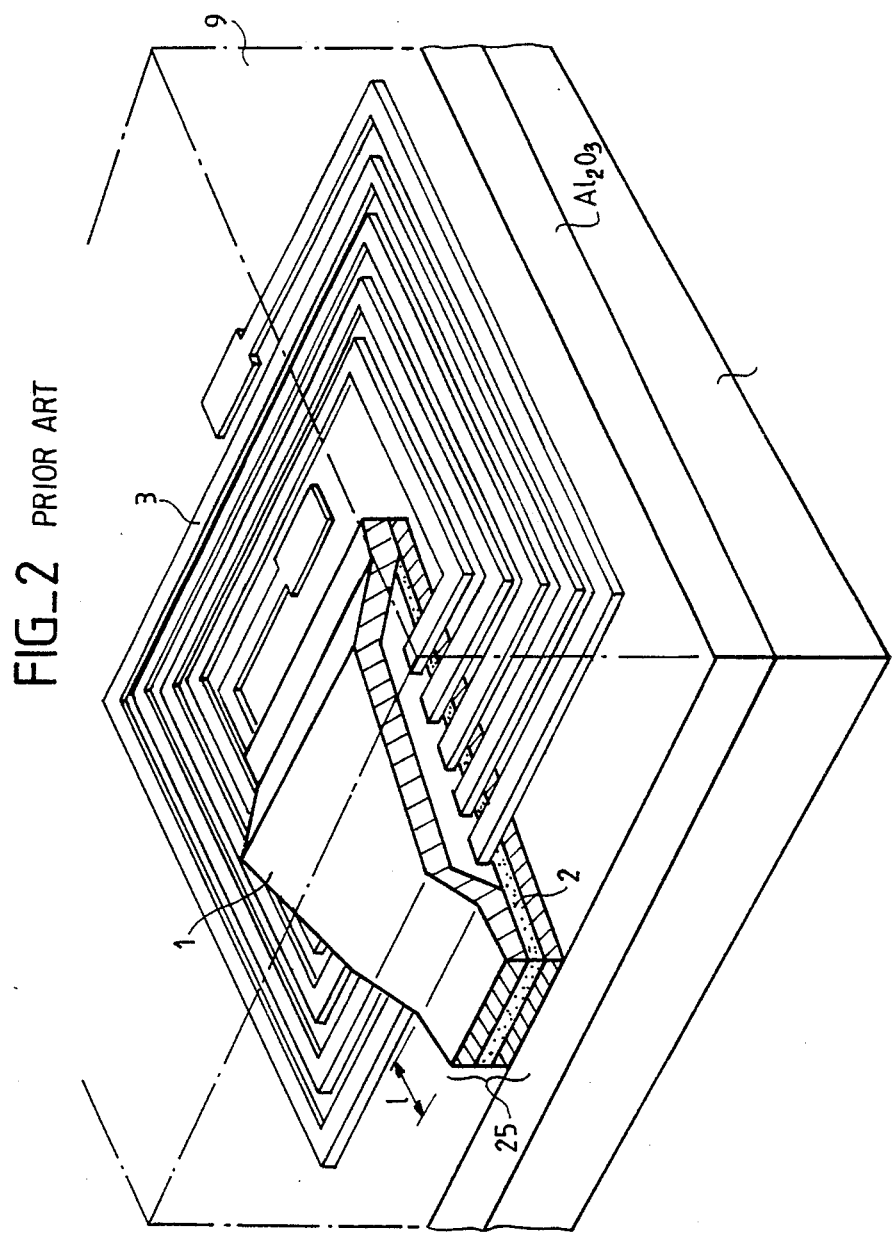
FIG._2 PRIOR ART

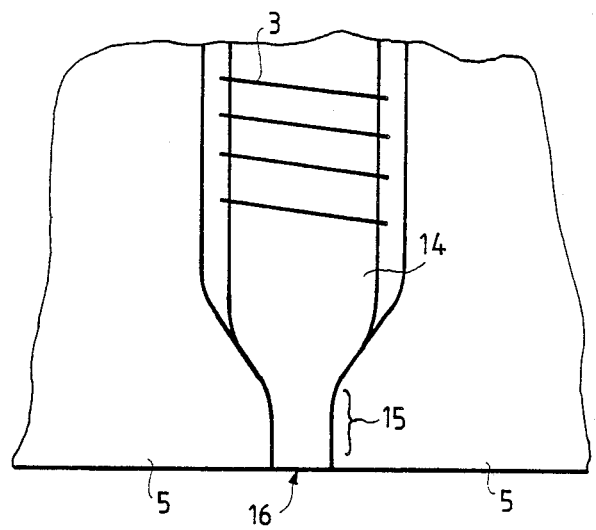
FIG_10
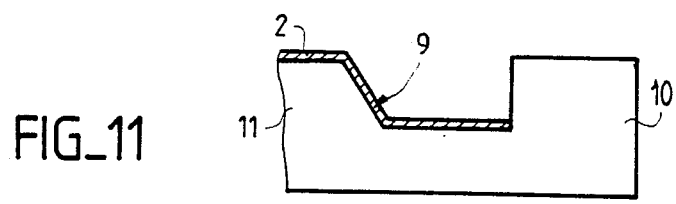
FIG_11
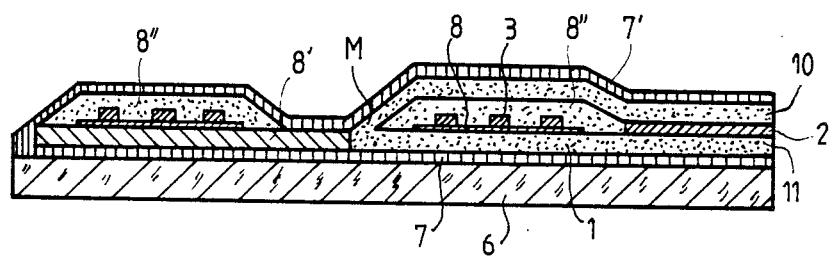
FIG_4

FIG_5
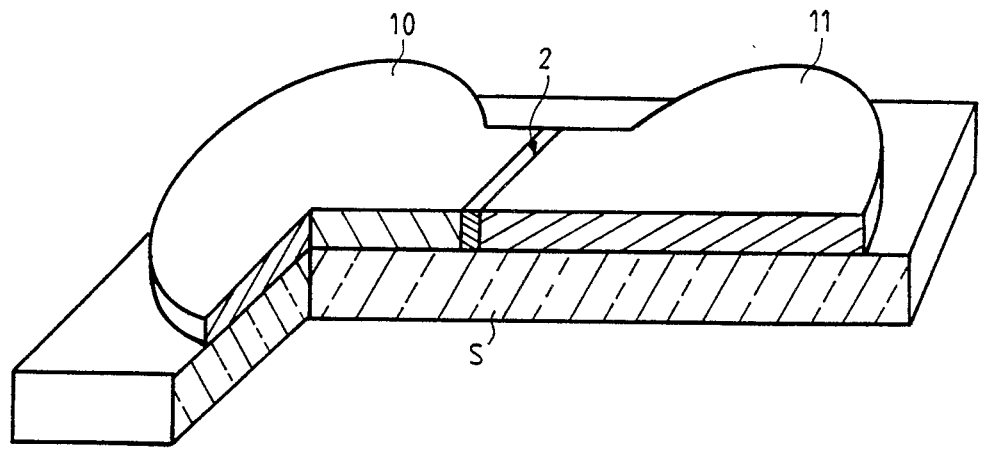
FIG_6
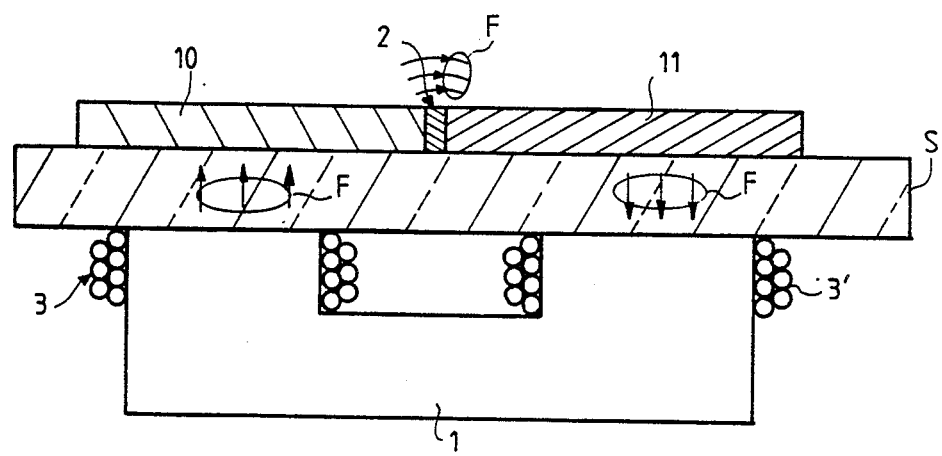

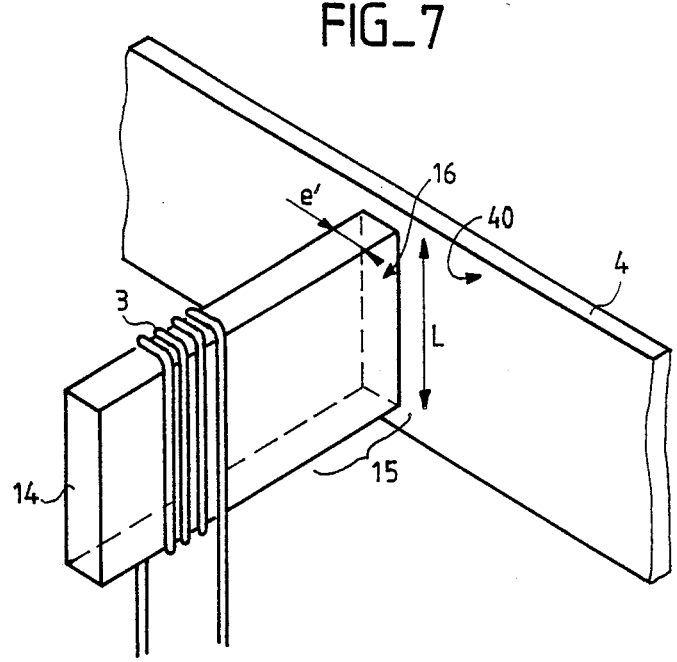
FIG_7
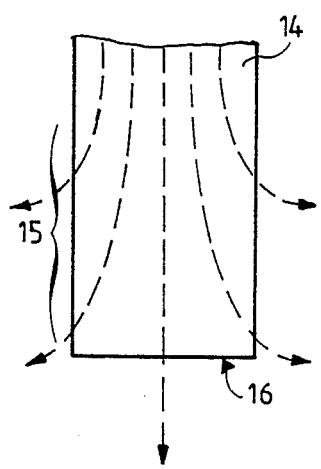
FIG_8
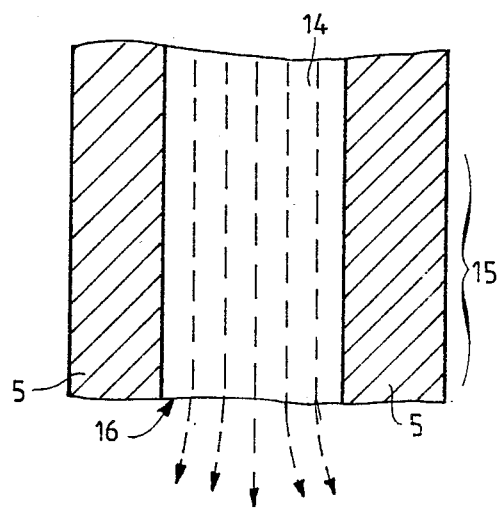
FIG_9

MAGNETIC RECORDING/PLAYBACK HEAD COMPRISING A SUPERCONDUCTING MATERIAL

BACKGROUND OF THE INVENTION

1. Field of the Invention

The present invention concerns a magnetic recording/playback head comprising a superconducting material and, in particular, a magnetic head in which a superconducting material is used to channel the magnetic flux emitted by the head towards the magnetic recording support.

2. Description of the Prior Art

To highlight the value of the invention, we shall first give a general description of existing magnetic recording/playback heads.

Magnetic recording/playback heads consist of a magnetic circuit 1 of high permeability, comprising a non-magnetic gap 2, of a thickness e, and an electrical circuit 3 which surrounds the magnetic circuit 1 (FIG. 1).

When the circuit 3 is crossed by a current, it emits a magnetic field H which is picked up by the circuit 1 and gets concentrated at the gap 2. Conversely, a local flux variation at the gap 2 induces a voltage V at the terminals of the circuit 3.

Presently available heads can be divided into two groups:

massive heads made by machining and assembling semi-heads made of magnetic material (for example, audio heads made of or magnetic material, domestic video (VHS) type heads made of ferrite monocrystal). The circuit 3 is coiled after assembly;

thin layer heads, such as those shown in FIG. 2, made by successive deposits of thin layers of magnetic materials of dielectrics and semi-conducting tracks etched so as to make the elements 1, 2 and 3.

Each of these groups can be used:

either for longitudinal recording, i.e. with a recording medium in which the magnetization is parallel to the support and to the flow of the tape;

or with recording perpendicular to the vertical, i.e. with a recording medium in which the magnetization is perpendicular to the support and to the flow of the tape.

For this second type of recording, it may be preferable to use heads in which the magnetic circuit 1 is not closed at the gap 2 by two symmetrical poles, only ore of the poles playing an active role in the recording. This pole is then the main pole or a single pole head.

The main criterion for characterizing a head is the signal-to-noise ratio which should be as high as possible.

$\eta$ the value of the signal is determined by efficiency (in recording and by reciprocity in playback). $\eta = H9x)/Ho$ with $H(x)$=magnetic field during recording at a distance x from the gap.

$Ho$ = maximum theoretical field during recording
  = $ni/e$ i = current in the circuit 3
n = number of rotations of the circuit 3
e = thickness of gap.

the intrinsic noise of the head (thermal noise) is proportionate to the real part of the impedance $$R = R_B + R_L$$

-continued with $R_B$ = resistance of the coil
  = $\rho l/s$ $$R_L = L \times \frac{\mu''_e}{\mu'_e}$$

with $\rho$ = resistivity of wire of circuit 3
l = length of wire proportionate to number of revolutions of circuit 3
s = section of wire
L = inductance of head proportionate to n2.
$\mu''_e$ = imaginary part of the effective permeability of the magnetic circuit.
$\mu'_e$ = real part of the effective permeability of the magnetic circuit.

The object of the invention, therefore, is to provide means which can be used to increase the signal-to-noise ratio of a magnetic head.

The invention can be applied to different types of heads, and it particularly concerns:

massive heads for longitudinal or perpendicular recording.

thin layer heads for longitudinal and, if necessary, perpendicular recording.

main pole or single pole heads for perpendicular recording.

SUMMARY OF THE INVENTION

The invention therefore concerns a recording/playback magnetic head comprising a magnetic circuit completed by two magnetic poles separated by a gap, the set of magnetic poles and the gap being arranged near a recording surface of a magnetic recording medium, wherein the gap contains at least one layer of superconducting material arranged in a direction substantially perpendicular to the recording surface of the recording medium.

The invention also concerns a magnetic recording/playback head in thin layers comprising a magnetic field induction circuit (3) made in thin layers by means of a superconducting material.

The invention also concerns a magnetic recording/playback head with a single pole, comprising a single pole provided with a magnetic field induction winding and having a magnetic field emitting end comprising an emitting face placed near a recording surface of a magnetic recording medium so as to emit the magnetic field perpendicularly to the recording surface, comprising at least one sheath made of a superconducting material covering the emitting end except for the emitting face.

Finally, the invention concerns a method for making a recording/playback head comprising the following steps:

(a) the making of a layer of magnetic material on a part of the layer;

(b) the making of an insulating layer on the remaining part of the layer;

(c) the making, on the magnetic material and insulant, of a layer of insulating material having, at its center, a part that has no insulating material and leaves the magnetic material free;

(d) the making, on the insulating layer, of a coil of superconducting material and, on the magnetic material, of a gap also made of superconducting material;

(e) the making, on top of the coil, of an insulating layer leaving said part of the magnetic material free;

(f) the making of a layer of a magnetic material covering said part of the magnetic material as well as the gap;

(g) the making of a layer of a superconducting material on the entire head.

BRIEF DESCRIPTION OF THE DRAWINGS

The various objects and features of the invention will emerge more clearly from the following description, made by way of example, with reference to the appended figures, of which:

FIG. 1 is a massive magnetic head of the prior art;

FIG. 2 is a thin layer magnetic head of the prior art;

FIG. 3 is a massive magnetic head according to the invention;

FIG. 4 is a thin layer magnetic head according to the invention;

FIGS. 5 and 6 show a flat magnetic head according to the invention;

FIGS. 7 and 8 show a single pole magnetic head;

FIG. 9 shows a single pole magnetic head according to the invention;

FIG. 10 shows an alternative embodiment of the magnetic head of FIG. 9;

FIG. 11 shows an exemplary embodiment of a part of a magnetic circuit according to the invention.

DETAILED DESCRIPTION OF THE INVENTION

A massive magnetic head of the prior art, such as the one shown in FIG. 1, has high recording efficiency because the section of the magnetic circuit can be easily reduced at the gap so as to concentrate the flux. By contrast, in playback, it has a signal-to-noise ratio which is not optimized for the following reasons:

In the case of a massive head, the quantity $R_L$ is preponderant because the inductance L is proportionate, among others, to the section S of the magnetic circuit at the gap 9 owing to the magnetic flux which crosses this gap formed by a material with a permeability which is typically equal to 1.

The section S is determined by the width L of the head (which determines the width of the recorded track) and the depth of the gap 1 which is fixed by the machining and wearing conditions of the head:

$$S = L \times 1$$

For example, a VHS video head will have the following characteristics:
e = 0.3 micrometers
L = 40 micrometers
1 = 20 micrometers
S = 800 square micrometers The invention enables this problem to be resolved by providing for a superconducting material in the gap 2, as shown in FIG. 3. For, standard materials have permeability which is very close to 1, thus enabling the field to pass through the gap.

On the contrary, the superconducting materials have zero permeability, thus preventing any passage by the field through the gap.

The field, therefore, cannot be looped except outside the gap, thus enabling an improvement in the signal-to-noise ratio of the massive heads by reducing the inductance (hence the noise of the head).

For, in the case of a massive head with a non-superconductive gap, the noise is proportionate to the inductance which is itself proportionate to the section of the magnetic circuit at the gap, namely $S = L \times 1$.

When the gap consists of a superconducting material, the field cannot be closed again except outside the gap and the inductance is then due solely to the leakage fields. This corresponds, as a first approximation, to an effective section S' of the order of $L \times e$. The noise is thus diminished by a factor $S/S' = 1/e$, namely about 66 in the example of the video head taken as an example.

Furthermore, it must be noted that the use of a superconducting gap can only increase efficiency owing to a more favorable configuration of the field lines. This gain, which is typically a gain by a factor of two, enables recording on materials with a coercive field which is twice higher, for a given material forming the magnetic circuit 1.

In certain manufacturing methods, the magnetic circuit is made in two parts and, to obtain a magnetic head magnetic circuit, two parts of magnetic circuits are attached together. FIG. 11 shows, as an example, a part (10) of a magnetic circuit. According to an alternative embodiment of the invention, before attaching two magnetic circuit parts to each other, the inside of at least one part of a magnetic circuit, especially the zone which will serve as an air gap 2, is coated with a layer of a superconducting material 9.

As an example, the thickness of a layer of this type may be about a few hundreds of angstroms so as to be greater than the depth of penetration of the magnetic field.

We shall now describe the design of a magnetic head in thin layers, according to the invention, of the type shown in FIG. 2.

The thin layer heads have far smaller sections S for two reasons: the manufacturing method enables a reduction in the depth of the gap 1 and, since this type of head functions, in principle, without any contact with the recording medium, it should not undergo any wear and does not require any gap 1 depth.

For example, a head for a hard disk will have the following characteristics:
e = 0.5 micrometers
L = 40 micrometers
1 = 2 micrometers
S = 80 square micrometers.

These heads therefore have the advantage, in principle, of having higher signal-to-noise ratios (higher by a factor of 10 or the assumption that the signal is the same).

However, these heads have three disadvantages:

they cannot work in contact with the recording medium, for the low value of the gap 1 depth rules out any wearing out in order to prevent any diminishing of the signal;

the machining of the head to bring 1 to a value of a few micrometers is a very delicate task and results in very mediocre production yields;

when 1 is kept at an excessively high value (greater than the thickness of the magnetic field), the field tends to get closed again in the gap, and the leakage field outside the gap, which is used for recording, is highly attenuated and quickly tends towards zero. The head can then record only on media with low coercive fields (hence media of low efficiency). Furthermore, by virtue of the principle of reciprocity, playback efficiency is reduced in the same ratio, thus bringing down the signal-to-noise ratio.

All these drawbacks are related to the fact that, in prior art heads, the field can get closed again through the gap 2 owing to the permeability, which is close to 1, of the materials commonly used to make this gap.

In providing, according to the invention, for a material with zero permeability in the gap, the closing of the fields in the gap is ruled out and this, therefore, enables the manufacture of thin layer heads with a gap 1 depth which is greater while, at the same time, preserving high efficiency. This therefore makes the machining of the heads far more simple and enables the use of these heads in contact with the recording medium since the depth 1 then permits a certain degree of wear. Consequently, the production yields and lifetime of the heads is appreciably increased.

It should be noted that a gain in efficiency by a factor of 2 is obtained in the case of massive heads.

Furthermore, the resistance R is chiefly due, in this case, to the resistance $R_B$ of the winding which may be cancelled if the coil is itself made of a superconducting material. The association, according to the invention, of a gap 2 and a coil 3, both made of superconducting material, thus enables both an increase in the signal and a reduction in noise. It can therefore be especially valuable for a head in which the coil has only one turn. For, both the coil and the gap can then be made, as shown in FIG. 4, by the same pattern of superconducting material, thus considerably simplifying the making of the head.

This type of head, made from non-superconducting materials, has a very mediocre signal-to-noise ratio, while a head of this type according to the invention, containing a gap and a coil made of superconducting material, may have a satisfactory signal-to-noise ratio, above all if it is associated with a transformer (fixed or rotating) which is itself superconducting, reducing the signal to a level which is sufficiently greater than the noise of the input amplifier.

FIG. 4 represents a thin film magnetic head of this type according to the invention.

An insulating substrate 6 is coated with a layer of superconducting material 7. A part of this layer 7 is coated with a layer of a magnetic material (1) up to the edge of the active face 25 of the head. The other part of the layer 7 is coated with insulating material 8'.

On the magnetic material 1 and the insulating material 8', there is the flat coil 3, made of a superconducting material and insulated from the preceding layers by an insulating material 8. The insulation of this coil is completed, on top, by an insulating material 8'.

On the layer of magnetic material 1, there is made the gap 2 by means of a superconducting material.

The magnetic circuit 1 is complemented by a magnetic material which covers the insulating material 8' and the gap 2. The entire unit is itself covered by superconducting material 7'.

We thus have a magnetic head, the magnetic circuit 1 of which goes inside the coil 3 and has two poles 10 and 11 framing a gap 2.

The method for making a magnetic head of this type will comprise the following steps:
(a) the making of a layer 7 of a superconducting material on a substrate 6;
(b) the making, on a part of the layer 7, of a layer of magnetic material (1);
(c) the making, on the remaining part of the layer 7, of an insulating layer 8';
(d) the making, on the magnetic material (1) and the insulating material 8', of an insulating layer 8 having, at its center, a part M which has no insulating material and leaves the magnetic material free;
(e) the making, on the insulating layer 8, of a coil 3 made of a superconducting material and, on the magnetic material (1), of a gap 2 made of a superconducting material;
(f) the making, on top of the coil 3, of a layer of insulating material 8'' leaving the part M of the magnetic material free;
(g) the making of a magnetic material layer covering the part M of the magnetic material 1, as well as the gap 2;
(h) the making of a layer 7' of a superconducting material on the entire head.

The different preceding steps are achieved by prior art depositing and etching methods.

According to an alternative embodiment, the layers 7 and 7' of magnetic material may not be made.

The FIGS. 5 and 6 show a flat head according to the invention. This head comprises, on a substrate S, two magnetic poles made of thin films 10 and 11, separated by a gap 2.

A magnetic circuit 1, carrying magnetic field induction coils 3 and 3', is located on the other side of the poles 10, 11 with respect to the substrate and facing these poles. A flux 10, emitted by the coils, goes through the substrate S and gets closed again by the poles 10 and 11.

As in the previous embodiments, the gap 2 comprises a superconducting material which, as shown in FIG. 6, makes the entire magnetic flux F created by the coils 3 and 3' go from one pole 10 to the other pole 11 without crossing the gap 2.

We shall now describe the application of the invention to a magnetic head for perpendicular recording.

This application flows from the same inventive idea as that of the earlier described embodiments of the invention, by the fact that it still concerns the channelling of the magnetic flux emitted by the head towards the recording medium.

The longitudinal or perpendicular character of a magnetic recording is determined more by the properties of the recording medium than by the head itself. Thus, the type of head shown in FIG. 3 can be used in both cases.

In certain cases, however, it is desirable to have heads which are more specifically suited to perpendicular recording, namely heads wherein the component of the magnetic field perpendicular to the area of the recording medium is preponderant with respect to the longitudinal component. The basic principle used to this end is to preserve only one pole of the magnetic circuit 1 in the active zone of the head, it being possible for the rest of the circuit to be closed back on to the recording medium by a so-called auxiliary pole or capable of being considered as getting closed again at infinity. A single pole recording head of this type is shown in FIG. 7.

In this type of head, the spatial resolution, namely the minimum wavelength which can be read by the head, is no longer determined by the thickness e of the gap but by the thickness of the main pole. In theory, a resolution of the order of $2e'$ can be contemplated, but this limit can be reached only for an ideal configuration of the field lines, which cannot be achieved with standard materials because the magnetic field lines, shown in dashes in FIG. 8, leave the pole before the face 16 of the end.

This phenomenon arises from the fact that the medium surrounding the pole has a permeabilitY close to 1.

According to the invention, to cope with this drawback, means are provided to confine the field within the pole by surrounding it with superconductive material with zero permeability.

FIG. 9 shows an exemplary embodiment of a magnetic head of this type. The pole 14 is enveloped, on its different faces apart from the face 16 at the end, by a material of null permeability and, more particularly, by a superconducting material 5. Thus, the magnetic field is confined in the magnetic pole 14. There is no leakage field through the lateral walls of the poles. The entire field leaves the pole 14 through the end face 16 as shown in dashes in FIG. 9.

The efficiency of a head of this type can be improved by working on the shape of the elements 1 and 5 in order to concentrate the flux on the active zone.

Thus, in the embodiment shown in FIG. 10, the magnetic pole 14 has, at its end 15, a contraction used to concentrate the magnetic flux. The superconducting part 9 fits the shape of this contraction.

Furthermore, the superconducting material, according to this embodiment, coats the head, namely the magnetic circuit 14 and the coil 3, except for the end face 16.

The magnetic circuit 14 can also be closed again by means of an auxiliary pole on the recording medium, provided with a highly permeable sub-layer. The auxiliary pole will be also provided with a sheath, made of a superconducting material channelling the magnetic field.

It must be noted that the improvement of the performances envisaged can be got under only two conditions:
the depth of penetration of the magnetic fields in the material should be sufficiently high;
critical field of the superconducting material should be sufficiently high.

It is quite clear that the above description has been given purely as a non-restrictive example. Other alternatives can be considered without going beyond the scope of the invention. The digital examples have been given only to illustrate the description.

We claim:

1. A recording/playback magnetic head comprising:
a magnetic circuit formed from two magnetic poles separated by a gap,
wherein the set of magnetic poles and the gap are arranged near a recording surface of a magnetic recording medium,
further wherein the gap contains at least one layer of superconducting material arranged in a direction substantially perpendicular to the recording surface of the recording medium; and
wherein said magnetic circuit comprises a magnetic field induction circuit formed as a thin film of the same superconducting material that is contained within said gap.

2. A magnetic recording/playback head according to claim 1, the gap consisting of a single superconducting material.

3. A magnetic recording/playback head comprising:
a magnetic driving circuit;
a single pole provided with a magnetic field induction coil and having a magnetic field emission end comprising an emission face placed near a recording surface of a magnetic recording medium so as to emit a magnetic field perpendicular to the recording surface, comprising at least one sheath made of a superconducting material covering the emission end except for the emission face; and
wherein said sheath of superconducting material covers the magnetic driving circuit mean and said magnetic field induction coil except for the emission face.

4. A magnetic recording/playback head according to claim 3, wherein the sheath of magnetic material is a layer enveloping the magnetic circuit and the winding.

5. A magnetic recording/playback head according to claim 3, wherein the magnetic field emitting end has a contraction, and wherein the sheath of superconducting material fits the shape of this contraction.

* * * * *